Dec. 1, 1964 T. H. SLOAN ETAL 3,159,279
INSPECTION APPARATUS
Filed May 12, 1961 6 Sheets-Sheet 1

INVENTORS
Theodore H. Sloan,
BY Miller Paruolo &
John McMackin,
Christel + Bean.
ATTORNEYS.

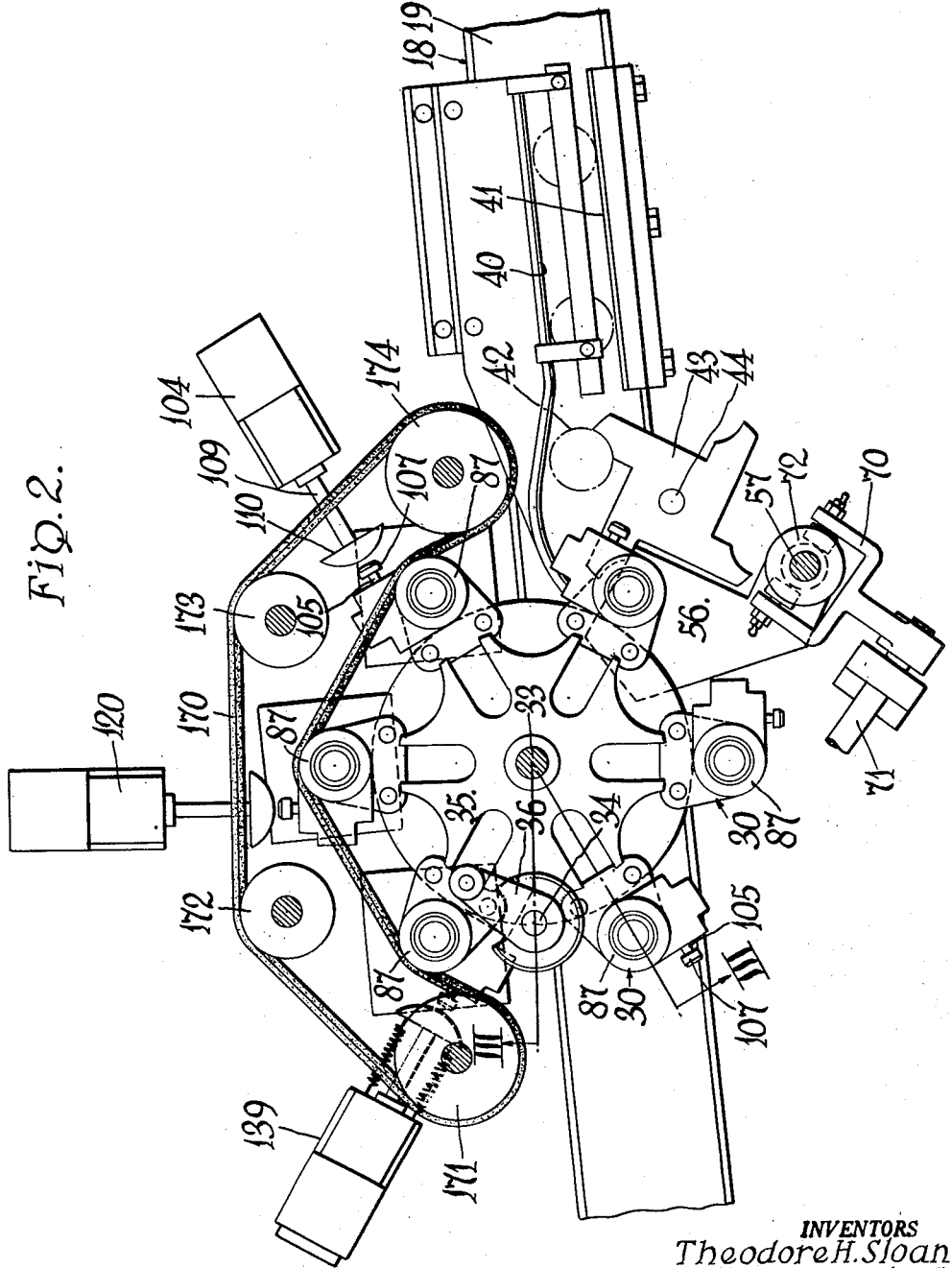

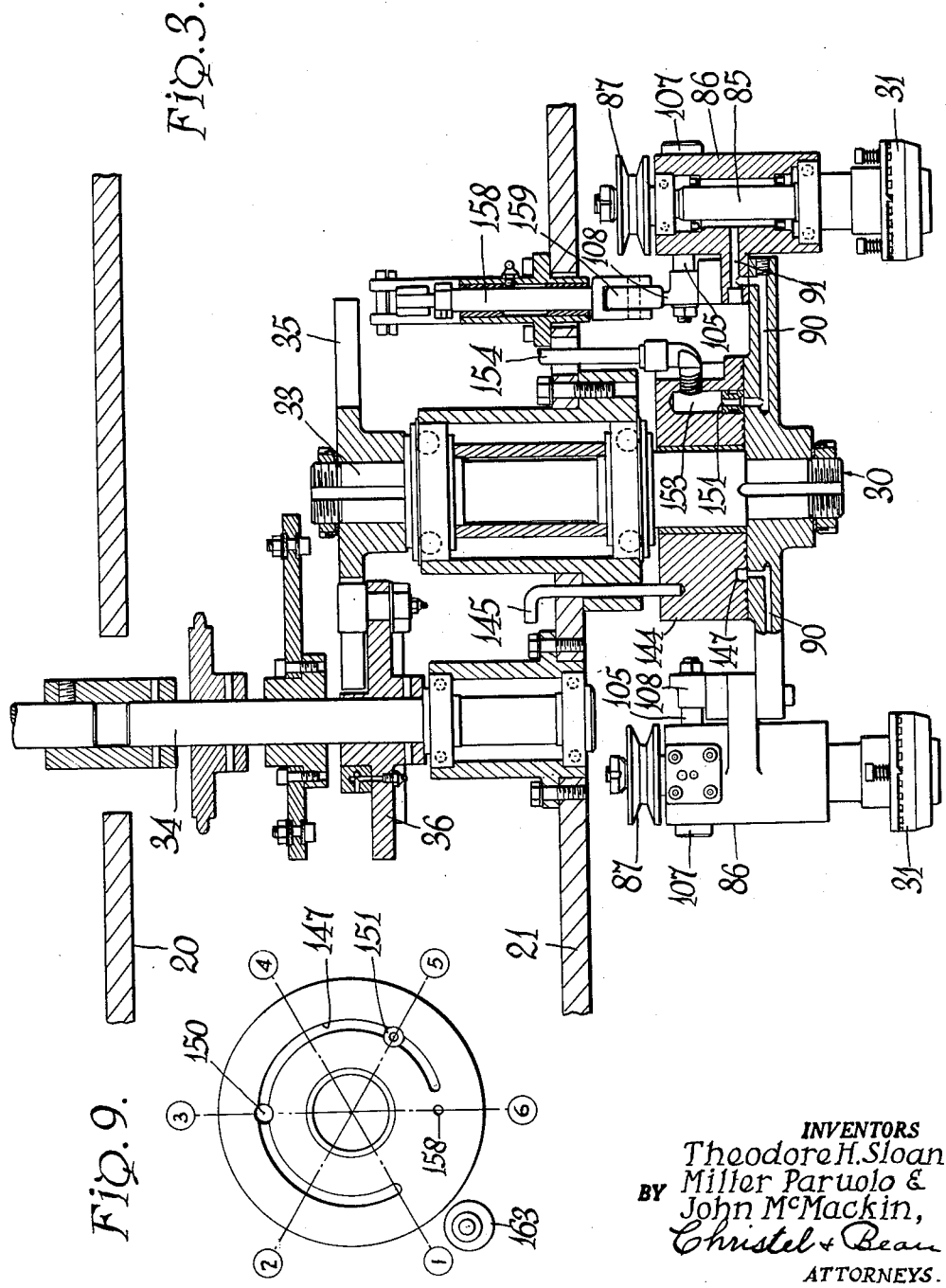

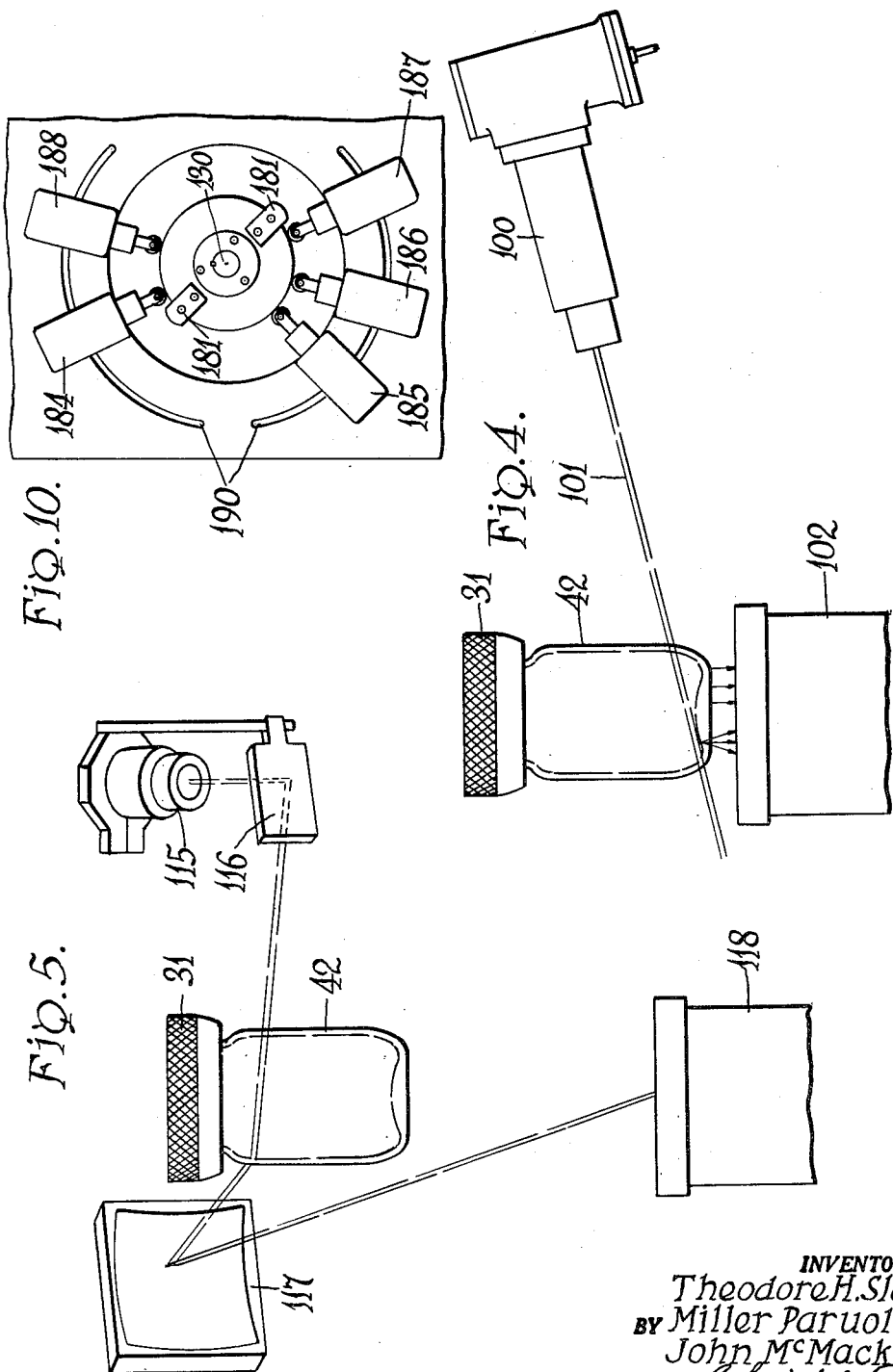

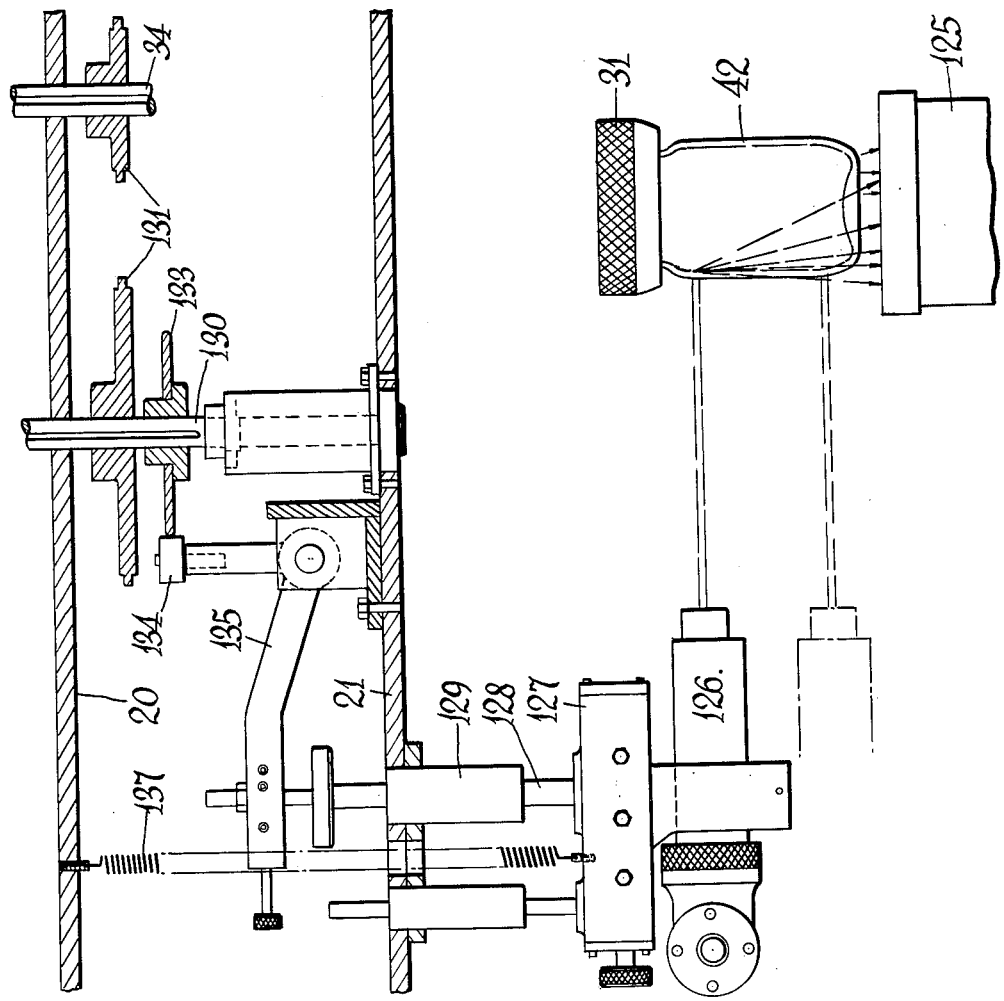

Dec. 1, 1964  T. H. SLOAN ETAL  3,159,279
INSPECTION APPARATUS
Filed May 12, 1961  6 Sheets-Sheet 6

INVENTOR.
Theodore H. Sloan,
BY Miller Paruolo &
John McMackin,

Christel + Bean
ATTORNEYS

United States Patent Office 3,159,279
Patented Dec. 1, 1964

3,159,279
INSPECTION APPARATUS
Theodore H. Sloan, Charleroi, and Miller Paruolo and John McMackin, Brockway, Pa., assignors to Brockway Glass Company, Inc., Brockway, Pa.
Filed May 12, 1961, Ser. No. 109,629
4 Claims. (Cl. 209—111.7)

This invention relates to a method and apparatus for the automatic inspection of glass articles, especially bottles, jars and other glass containers.

Numerous prior art proposals provide for the automatic inspection of certain portions of glass containers by rotating the containers about their axes while directing a light beam against a preselected point on the container and employing light sensitive means for sensing abnormal reflection or refraction resulting from imperfections or flaws in the container under inspection.

In the methods and apparatus of the prior art important limitations have been present as to the portions of containers which could be successfully inspected and as to the thoroughness and sufficiency of inspection of such portions.

The present invention provides a method and apparatus which provide for the automatic inspection of virtually all of the major portions of containers in a single complete apparatus. The inspection of the lip or finish portions of containers by automatic inspection means has been successfully accomplished on a commercial scale for some time. An example of apparatus suitable for inspecting such finish portions is shown and described in United States Letters Patent No. 2,902,151 to George G. Miles and John J. McMackin.

The present method and apparatus cooperate with this prior art apparatus in that containers passing to the present apparatus are gripped or engaged by their lip or finish portions leaving the remainders of the containers freely exposed and accessible, and are manipulated while thus supported in such a way as to effect inspection of the complete containers excepting only such finish or lip portions. In the form shown herein by way of example this general shoulder, body and bottom inspection procedure is accomplished by supporting the upper open end of a container in vacuum chucking means and moving cointainers through certain inspection cycles while thus suspended, as will appear later herein.

In the apparatus of the present invention a series of successive inspection steps is carried on with a container moving progressively from one to another of the inspecting stations through a complete inspection cycle. Speed and efficiency of the inspection operation is greatly enhanced by the fact that containers pass through a series of inspection stations without interruption until they reach an ultimate discharge phase of operation and the arrangement is such that, when a defect is detected at any of this series of inspecting stations, the container continues through the inspection cycle without interrupting the same while memory apparatus is activated or set up at any of the inspection stations in such a way that the container is ultimately rejected at the end of the cycle if a defect has been detected at any point in its passage through the series of inspecting stations.

In a preferred form the means for registering or recording the existence of a defective container at any of the several inspection stations for producing ultimate rejection of such container comprises a simple mechanical arrangement which is relatively free from the probability of failure. Further, the station at which a defect is registered may readily be observed during inspection cycles of operation so that recurring defects in a particular portion of a number of containers may readily be detected and observed.

In addition to the novel general arrangement and operation of the inspection machine a number of advantages are present in the manner in which the individual inspection operations are accomplished. In the present instance the several detecting photosensitive tubes, preferably photo-multiplier tubes, are each aligned coaxially with the containers beneath the same at the several inspection stations.

Accordingly, various modifications, adjustments and variations in the actual light emitting and light directing means, positional, directional and otherwise, may be effected at the various stations and inspections of different portions of containers or inspections for different types of faults may be interchangeably incorporated without affecting or disturbing the light sensitive or "pick-up" portions of the optical inspecting means. Also the uniform coaxial location of the several photosensitive cells facilitates inspecting containers of various sizes and shapes, again without necessitating a relocation, re-orientation or other modification of the photosensitive means.

In inspecting the bottoms of containers the light beam is preferably directed radially toward the container and in such a way that the light beam skims the interior surface of the bottom of the container. When the interior bottom wall of the container has the usual raised center portion the light beam is preferably directed slightly downward so that it skims the surface of the far side of the bottom interior, from the center outward. By reason of this general skimming arrangement tramp glass, spikes, jaggers and other imperfections projecting from such bottom wall produce marked changes in the light level beneath the container and accordingly produce sharp activating impulses in the underlying photo-cell.

In the means provided for inspecting the side walls of containers the combination of rapid rotary movement of a container and relative vertical movement of the illuminating device which directs a light beam against such side walls during container rotation scans the entire side wall surface so that during such scanning even relatively minute defects will at one time or another be sharply within the focus of the illuminating beam and thus produce a marked difference in the amount of light which is transmitted by the container body to the bottom thereof where it is picked up by the underlying photosensitive cell.

The general inspection procedure of the present apparatus is such that the presence of foreign or extraneous matter, whether glass or any other substance, is detected whether it is on the inside or the outside of the surface of the container, and thus brings about rejection of the container.

Various other objects and advantages of the apparatus as a whole and various sub combinations thereof and of the method of the present invention will appear to those skilled in the present art from a study of the embodiment of the present invention which is illustrated in the accompanying drawings and described in the following specification. However, it is to be understood that such embodiment is illustrative only and that the principles of the invention are not limited thereto nor otherwise than as defined in the appended claims.

In the drawings:

FIG. 2 is a top plan view of a portion of the structure of FIG. 1, upper portions thereof being broken away as indicated generally by the line II—II of FIG. 1;

FIG. 3 is an irregular cross sectional view of the structure of FIG. 2 taken as indicated by the line III—III of FIG. 2;

FIG. 4 is a fragmentary somewhat schematic elevational view of the first of the series of inspection stations of the apparatus of FIGS. 1, 2 and 3;

FIG. 5 is a fragmentary somewhat schematic elevational view of the second of such series of inspection stations;

FIG. 6 is a fragmentary somewhat schematic elevational view of the third of such series of inspection stations, portions of the mechanism thereof being in cross section;

FIG. 9 is a bottom plan view of a sub-atmospheric pressure distributing block employed in conjunction with the vacuum chucking implements which lift and hold the containers during inspection operations; and FIG. 10 is a somewhat schematic top plan view of a group of control valves which are electromagnetically operated in timed relationship with the operation of the machine.

Figure 1:
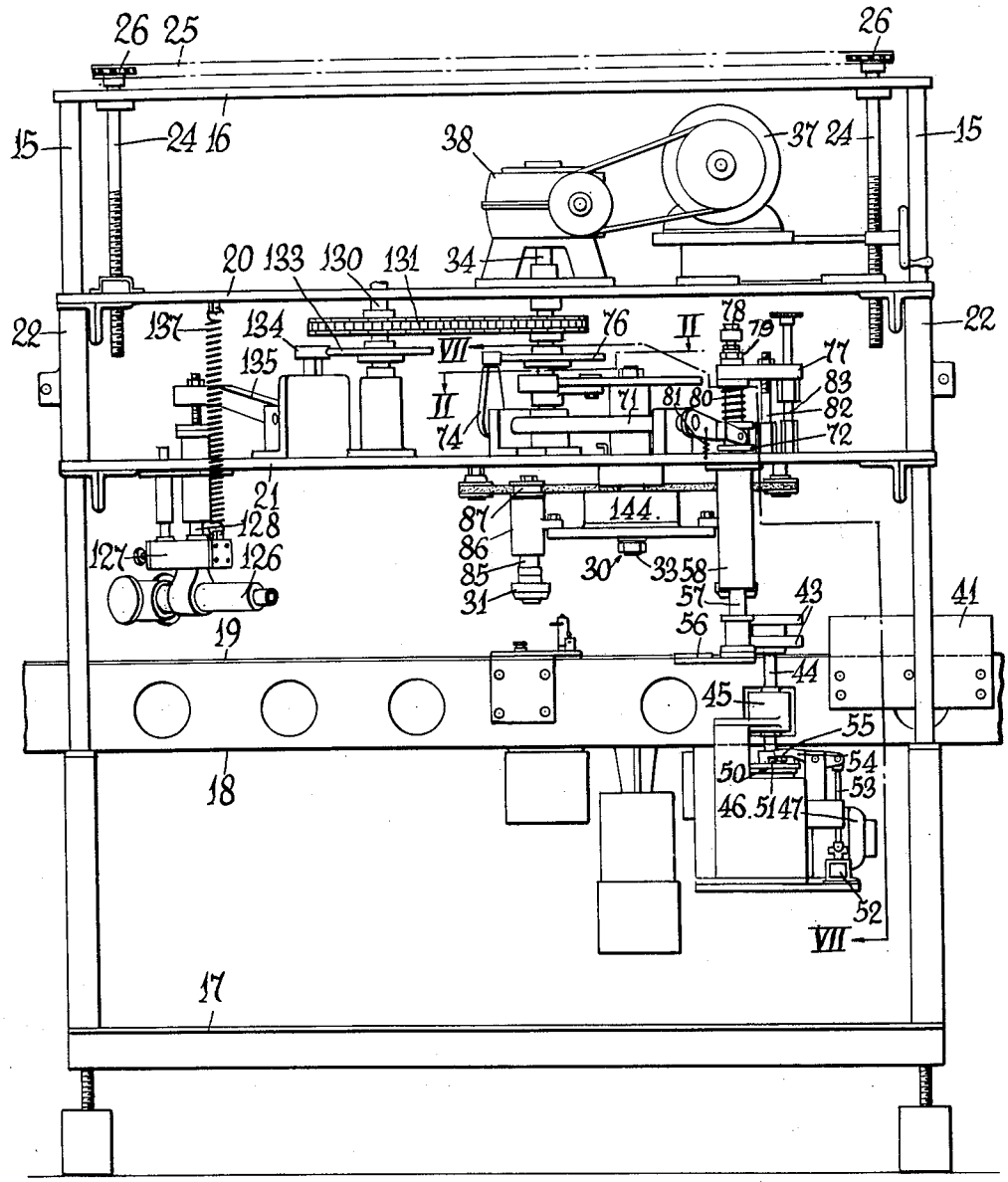
FIG. 1 is a side elevational view of one form of the inspection apparatus of the present invention shown in association with an article conveyor.

The apparatus illustrated herein to exemplify the principles of the present invention comprises a supporting framework which straddles a conveyor belt. The latter carries glass containers to the inspection apparatus and carries containers which pass the several inspection steps away from the apparatus. The framework is generally rectangular in both side and end elevation and, referring to FIG. 1, comprises four corner posts 15 connected at their upper ends by a rectangular frame 16 and at their lower ends to a rectangular framework 17.

A conveyor support structure 18 extends through the framework and the numeral 19 designates a conveyor belt which passes along the top of the support structure 18 to move containers to and from the inspection apparatus. Upper and lower horizontally extending support plates 20 and 21 are fixed to each other, as by means of vertical tubes 22 which are slidably disposed on the corner posts 15. The support plates 20 and 21 may be jointly raised and lowered to adapt the apparatus for the inspection of containers of various heights.

For this purpose four height adjusting screws 24 are journaled in the upper frame 16 and are held against vertical movement relative thereto. The threaded lower portions of the screws engage the upper support plate 20 and the four screws 24 are connected for joint synchronous rotation by a roller chain 25 which extends about sprockets 26 fixed to the upper ends of the screws 24. The chain and sprocket means may be actuated by a hand crank (not shown) for raising and lowering the support plates 20 and 21.

Speaking generally, the containers are fed successively to the inspection apparatus and a rotary turret designated generally by the numeral 30 is provided with six chucking devices 31 which are equally spaced about the axis of turret 30 and extend downwardly to engage the upper ends of containers to be inspected in a manner which will presently appear. A turret shaft 33 is journaled in lower support plate 21 and a turret drive shaft 34 bears at its lower end in the lower support plate 21 as clearly shown in FIG. 3.

A Geneva wheel 35 is fixed to turret shaft 33 and a driving member therefor designated 36 is fixed to the turret drive shaft 34. The main drive for the inspection apparatus is from an electric motor 37 which is belt connected to a speed reducing gear 38 whose output shaft connects directly with the turret drive shaft 34. By reason of the Geneva drive just described each rotation of the turret drive shaft 34 produces one sixth of the rotation of the turret shaft 33, the increments of rotation of the latter being intermittent and permitting sufficient dwell in each position to effect the desired inspection and container introduction and discharge operations.

By way of general explanation, the six "stations" thus established are employed successively as follows in the form of the present apparatus illustrated herein by way of example. At the first station the container is introduced and raised into engagement with a vacuum chucking device. At the second station the bottom wall of the container is inspected, at the third station the shoulder portion of the container is inspected, at the fourth station the body or side wall of the container is inspected, at the fifth station good containers are discharged back to the conveyor belt, and at the sixth station bad containers are discharged to a reject chute.

As will appear more fully hereinafter, mechanical "memory" or carry-over means are provided whereby a container exhibiting defects at any one of the successive inspection stations is ultimately rejected after being carried through the complete inspection cycle in order not to disrupt the continuity of the inspection cycle and so that the mechanism is not unduly complicated by the provision of reject means and reject receiving means at each of the several inspection stations.

The construction and operations of the mechanisms at the several stations will now be described, beginning with the loading station at which containers are introduced to the inspection mechanism. Referring particularly to FIG. 2, containers carried to the apparatus by the conveyor belt 19 are directed between guide rails 40 and 41 in a manner well understood in the glass container manufacturing art.

Figure 7:
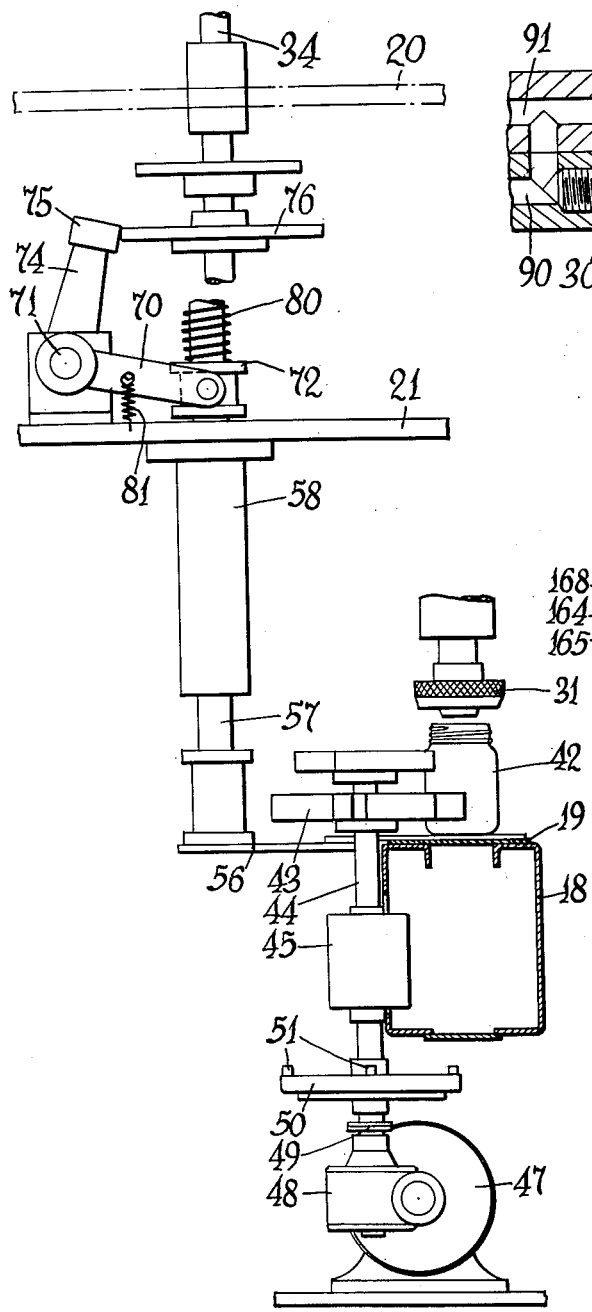
FIG. 7 is an irregular fragmentary cross sectional view taken approximately as indicated by the line VII—VII of FIG. 1.

A starwheel for engaging a container fed between the guide rails 40 and 41, as for instance the container indicated at 42 in FIGS. 2 and 7, is shown at 43 and is mounted on a vertical shaft 44 journaled in a bearing 45 carried by a support 46 which may be mounted rigidly upon the lower framework of the apparatus. An electric driving motor 47 drives a reducing gear 48, see FIG. 7, and a shaft 49 carried by the latter has frictional driving connection with starwheel shaft 44 as by means of a clutch 50.

The upper friction disc of the clutch 50, which is carried at the lower end of starwheel shaft 44, has four equally spaced blocks 51 at its upper surface. Referring to FIG. 1, solenoid 52 operates through a link 53 to oscillate a rock arm 54. The latter has a block 55 fixed to the lower portion of its outer end and this block 55 is normally in a lowered position in the path of a friction disc block 51 to hold the starwheel shaft against rotation.

When solenoid 52 is momentarily energized in the cyclic operation of the machine the rock arm 54 raises the block 55 to unblock the upper friction disc whereupon the starwheel shaft 44 rotates one fourth of a rotation, the starwheel having four container-engaging projections. By the time the next block 51 of the friction disc moves to the arresting block 55 the latter will have lowered to engage the same and arrest the starwheel shaft until the solenoid 52 is again energized.

Thus the timed intermittent rotation of the starwheel 43 moves containers 42 successively into position to be elevated to engagement with vacuum chuck means for retaining such containers engaged by their upper ends throughout inspecting cycles. Movement of a container 42 by starwheel 43 moves the former laterally onto a receiving foot 56 of the container elevating mechanism.

As shown in FIGS. 1 and 7, the container elevating foot 56 is carried at the lower end of a shaft 57 which is vertically slidable in a bearing 58 carried by support plate 21.

A lifting arm 70 fixed to a rock shaft 71 engages a spring loaded collar 72 which is slidably mounted on elevator shaft 57. Rock shaft 71 is mounted in bearings carried by support plate 21 and is provided with a further rock arm 74 which carries a follower 75 in engagement with the periphery of a cam 76 which is fixed to and rotates with the turret drive shaft 34.

Means are provided for accurately adjusting the range of movement of the elevator mechanism to predetermine the upper and lower limits of movement thereof. An arm 77 at the upper end of elevator shaft 57 is fixed against axial movement relative thereto. The numeral 78 designates a bumper at the upper end of shaft 57 which is adjustable vertically relative to the upper end of the shaft and relative to arm 77 by threaded means 79. A compression coil spring 80 acts between shifting collar 72 and arm 77.

From the foregoing it will be seen that the cam 76, which is provided with overtravel at both its high and low points, will move elevator shaft 57 upwardly until the upper end of a jar 42 stops against chuck 31 whereupon coil spring 80 compresses during the remaining rising movement of cam 76. If there should be no jar on the elevator upper movement will stop when bumper 48 strikes plate 20, whereupon the spring 80 will again compress.

An extension coil spring 81 acts between arm 70 and plate 21 and tends to draw the arm downwardly. When the cam 76 permits arm 70 to move downwardly, the force of gravity causes shaft 57 to move downwardly until a further adjustable bumper 82 carried by arm 77 strikes the upper surface of plate 21. A spring pressed detent pin 83 carried at the outer end of arm 77 engages openings in plate 21 to selectively locate the arm 79 in either of two angular positions. Since arm 77 is fixed to elevator shaft 57 this swinging movement permits the lifting foot 56 to be swung to inoperative position off of the conveyor belt 19 when its use is not desired or for other purposes. Detent pin 83 is released to permit such swinging movement of the elevator mechanism by manual lifting movement thereof.

Thus the elevator shaft 57 is periodically lifted to raise containers 42 to a chuck 31 at the receiving or loading station in timed relation with the indexing operation of the turret 30.

Figure 8:
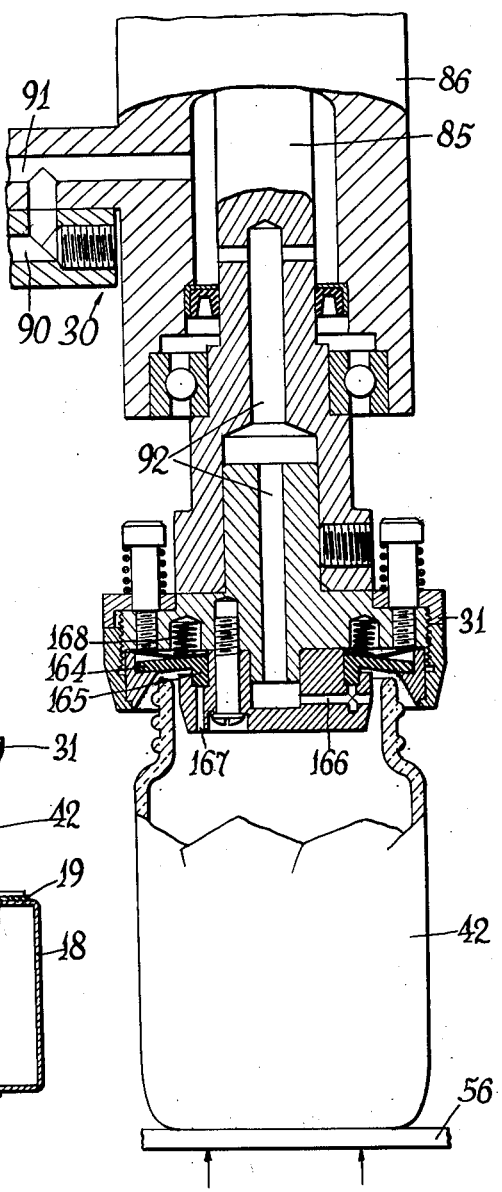
FIG. 8 is a central vertical cross sectional view through one of the container chucking devices and the supporting bearing means thereof.

One of the chucks 31 and the rotatable spindle which supports the same is shown in detail in the cross sectional view of the turret 30, FIG. 3, to which reference will now be had, and the internal details of one form of chucking mechanism is shown in further detail in FIG. 8. Six spindles 85 are mounted for anti-friction rotation in bearing supports 86 which are fixed to and equally spaced about the periphery of turret 30. A grooved pulley 87 is fixed to the upper end of each chuck spindle 85 and the manner in which the spindles are periodically rotated through the cooperation of the pulleys 87 will appear later herein.

Partial vacuum for operating the several container chucks 31 is supplied through radiating passages 90 in turret 30 which lead to passages 91 in each turret bearing support 86 for the several chuck spindles and thence through passage means 92 formed in the spindle, see FIG. 8. The manner in which vacuum is supplied to the several passages 90 and interrupted at proper times in the operation of the apparatus will be described later herein, as will the construction and operation of the chucking members 31.

As a container 42 moves to station No. 2 the spindle 85 of the chuck 31 which supports the same is rotated, jointly with the spindles 85 of the chucks at the No. 3 and No. 4 stations, in a manner which will be described later herein.

Upon an indexing operation of the turret 30 a container thus engaged by a chuck 31 at the loading station is moved to the No. 2 station, the first inspection station, where, in the present instance, the bottom of the container is inspected for imperfections or irregularities, more particularly for what is known in the art as "tramp" glass, namely extraneous glass particles or lumps which adhere to the inside or outside surfaces of the bottom of the interior of the container, or for any other extraneous or foreign material.

FIG. 4 shows the optical arrangement provided at station No. 2 for this purpose. A light source 100 directs a concentrated beam of light 101 against the lower portion of the container in such a way that it more or less skims the interior bottom surface of the container. If the container bottom is sufficiently regular in contour a certain fairly constant intensity of light from the beam 101 will be transmitted downwardly through the bottom of the container to a photo-sensitive tube 102 which is coaxial with the container at the No. 2 station.

If the container bottom is irregular and particularly if tramp glass or any foreign material is present the intensity of light through the bottom of the container to the photo-tube 102 will be greater or less than normal and an electrical impulse from the photo-cell, amplified in conventional manner, will energize an electromagnet 104 (see FIG. 2) which operates to set up a reject mechanism with respect to the container then at station No. 2.

Referring to FIG. 3, each chuck spindle bearing housing 86 gives horizontal sliding support to a rod 105 which extends in a generally radial direction but lies laterally of the spindle 85. As shown in FIGS. 2 and 3 each rod 105 has an enlarged head 107 at its outer end and a camming projection 108 at its inner end.

Upon a reject impulse of the electromagnet 104 at station No. 2 its armature 109, through an enlarged head 110, acts against head 107 of the rod 105 of the spindle bearing housing 86 which is then located at station No. 2 to move the camming projection 108 thereof radially inwardly to the reject position illustrated in FIG. 3. Spring pressed detent means are preferably provided for resiliently retaining rod 105 in either of its end positions, as for instance, a spring pressed ball acting between the cylindrical bearing surfaces of the rod and its bearing in housing 86.

The right hand side of FIG. 3 illustrates a chuck spindle bearing housing 86 which has already moved to the No. 5 station at which good containers are discharged and the camming projection 108 has been moved inwardly to a reject position. The manner in which the camming projection 108 comes into operation at this station will be described more fully later herein. Suffice it to say at this time that whenever, at any of the inspection stations comprising Nos. 2, 3 and 4, an abnormal optical condition is produced by a container defect, the electromagnet at such station moves the camming projection 108 of the spindle carrying the defective container to the radially inward position illustrated at the right hand side in FIG. 3.

Following the inspection of the bottom of a container at the No. 2 station as just described the turret 30 again is indexed to move the container to the No. 3 station where the shoulder thereof is inspected as shown somewhat schematically in FIG. 5. In the present instance the light is reflected to and from the container by means of mirrors for convenience in locating the light source and to permit the photo-tube to be in the underlying coaxial position of the photo-tubes at the other inspection stations.

Light from a source 115 is directed against the shoulder of the container at this station by a mirror 116 and light passing through this portion of the container impinges upon a concave mirror 117 which is disposed to reflect the same to a photo-tube 118. A defect in the shoulder portion of the container produces a variation in the light level in the same general manner as in the case of the bottom inspection and the abnormal condition. Such variation being sensed by photo-tube 118 and suitably amplified, actuates a rejection electromagnet 120 at station No. 3 which, if the container has previously passed station No. 2 without exhibiting a defect, operates to press the rod 105 radially inwardly in the manner described above in connection with defects sensed at station No. 2.

Upon the conclusion of this inspection step the turret again is indexed through one sixth of a rotation to present the subject container to the No. 4 station where the side wall thereof is inspected in a manner which will now be described with particular reference to FIG. 6. The container 42 to which reference has been had with respect to the No. 1 and No. 2 stations is again disposed coaxially above a photo-tube designated 125.

At station No. 4 a light source 126 is mounted to travel upward and downward as the container is rapidly rotated during the inspection period so that the light source scans the entire side wall surface during the inspection at the No. 4 station. In the interests of mechanical scanning efficiency and since one movement of the light source across the side wall surface of the container suffices for a full inspection thereof, the light source is arranged to travel downward during inspection of a given container, thence upward during inspection of the succeeding container, and so on.

The light source 126 is mounted at the underside of a support 127 disposed at the lower end of a shaft 128 which is mounted for vertical sliding movement in a bearing 129 carried by support plate 21. As will be noted by reference to FIG. 1, a vertical shaft 130 journaled at its ends in the support plates 20 and 21 is driven by a chain and sprocket connection 131 from the turret drive shaft 34 and the ratio of this drive is 2 to 1 so that the shaft 130 makes one half rotation for each rotation of turret drive shaft 34 and therefore for each indexing increment of the turret 30.

A cam 133 on shaft 130 acts against a follower 134 carried at one end of a bell crank 135, the other end of which engages the upper end of shaft 128 to raise and lower the same as aforesaid to cause the light source 126 to scan the side wall of a container 42. It will be noted that shaft 128 is moved positively in a downward direction by operation of the cam 133 and is raised by operation of an extension coil spring 137 which engages between support plate 20 and the light source support 127.

As heretofore, an abnormal light impingement on photo-tube 125 disposed axially beneath the container 42 at this station energizes an electromagnet 139 at the No. 4 station to move the rod 105 radially inwardly to the reject position if the rod has not already been moved inwardly at a preceding inspection station.

During all of the foregoing operation partial vacuum has been continuously applied to the passages 90, 91 and 92 leading to the chuck 31 in a manner and by means which will now be described. A pressure distributor block 144 is mounted for free relative rotation on the turret shaft 33 as shown in FIG. 3 but is held against rotation by a pin 145 which extends through support plate 21 and into block 144, so that the latter is held in a fixed position even though it is supported by the rotatable turret and turret shaft.

The lower face of distributor block 144 is provided with an arcuate groove 147 best shown in FIG. 9 which is in communication with passages 90 of the turret 30 when such passages are in angular registry therewith during the relative rotation of the turret 30 with respect to block 144. Specifically, the groove 147 communicates with each particular passage 90 from the point where the chuck 31 associated with such passage reaches station No. 1 until the particular chuck reaches a point between stations No. 5 and No. 6, with an exception to be noted below.

Sub-atmospheric pressure or partial vacuum is continuously connected to the groove 147 of fixed block 144 by a passage 150 and, as shown in FIG. 3, an annular bushing 151 is interposed in groove 147 at station No. 5. A peripheral groove about bushing 151 permits the partial vacuum prevailing in groove 147 to pass about the bushing so that the partial vacuum is present throughout groove 147 excepting at station No. 5.

As shown in FIG. 3, the bore through bushing 151 establishes fluid communication between whichever passage 90 is in registry therewith (at station No. 5) and a passage 153 which leads to a pressure conduit 154. Conduit 154 is normally connected to atmosphere but a solenoid valve therein (not shown) is actuated by upward movement of a rod 158 which has a cam follower 159 at its lower end. When this solenoid valve is actuated at station No. 5 by reason of a reject rod 105 having been moved radially inwardly at a preceding station the solenoid valve connects conduit 154 to sub-atmospheric pressure.

Accordingly, the partial vacuum is not interrupted at station No. 5 as to the imperfect container and the same is carried past station No. 5 by the chuck 31. When the reject rod of a particular station has not been pushed in at any one of the inspection stations the atmospheric pressure through bushing 151 permits such container to be released at station No. 5 whereupon it drops to the conveyor belt 19 and is carried along as a good container.

It will be noted that arcuate groove 147 ends between stations No. 5 and No. 6 and the numeral 158 designates an air passage in distributor block 144 in registry with station No. 6 which vents the container and chuck and thereby causes bad containers which carry past station No. 5 to drop to a reject chute at station No. 6.

To insure release of good containers at station No. 5 the air passage leading to the solenoid valve operated by the reject mechanism, which air passage is connected only when good containers arrive at station No. 5, is connected by a conduit (not shown) to a solenoid valve (not shown) controlled by a limit switch designated 187 in FIG. 10. The inlet passage of this valve is connected to air under positive pressure so that an air blast is connected to the passages 90, 91 and 92 at station No. 5 if communication thereto has not been interrupted by the reject mechanism 105, 158 and the solenoid valve controlled thereby. A reset roller 163 between station No. 6 and station No. 1 pushes rods 105 outwardly to starting position if they have been moved inwardly during the preceding cycle.

Various forms of chucking devices may be employed for holding the containers by sub-atmospheric pressure. In the form shown in FIG. 8 the fixed annular chuck structure 31 contains a rubber ring 164 which has an internal flange 165 normally seating in a groove in the chuck structure. This groove connects with the passages 92 by way of radiating passages 166 and connects with the interior of a container 42 by a series of vertical passages 167. In FIG. 8 the container 42 is moving upwardly but has not yet reached a position of engagement against ring 164.

Ring 164 is normally held downwardly with its flange 165 in closing position in the aforesaid groove by springs 168. However, when the finish or upper rim portion of a container is moved upwardly into engagement with ring 164 by the elevator mechanism at station No. 1 it moves ring 164 upwardly to open the groove and connect passages 166 and 167 and thus apply sub-atmospheric pressure to the interior of the container and thus hold the same in the chucking mechanism until such sub-atmospheric pressure is terminated at either station No. 5, in the case of good containers, or station No. 6, in the case of rejected containers, as described above.

Pulleys 87 at the upper ends of the chucking spindles 85 have been referred to earlier herein. The means for rotating such spindles at the inspecting station, stations 2, 3 and 4, are shown in FIGS. 2 and 3, particularly the former. An endless belt 170 passes around supporting pulleys designated 171 through 174 in FIG. 2 and the three pulleys 87 of the chucking mechanisms at the inspecting stations are in engagement with belt 170 to be rotated thereby.

The pulleys 171 through 174 are mounted at the underside of plate 21 and one of them in the present instance the pulley 174, comprises the drive shaft of a small electric motor (not shown) which is mounted at the upper side of plate 21 for constantly driving belt 170 and thus rotating the several chucking spindles as they move into the series of inspection stations.

FIG. 10 illustrates somewhat schematically a group of limit switches which are controlled by a cam 180 fixed to the upper end of shaft 130 which, as previously noted, rotates at one-half the speed of the turret drive shaft 34. Accordingly, cam 180 has two projections 181 for operating the several limit switches once during each operating cycle.

In FIG. 10 the limit switches 184 and 185 comprise starting and stopping switches which define the effective period of the photoelectric cells so that they are effective only during periods when the turret is at rest and containers are at proper inspection stations. Switch 186 operates a starwheel solenoid 52 which momentarily releases the clutch 50 for driving operation. Switch 187 controls a valve which momentarily applies the container releasing air blast at station No. 5 as aforesaid. Switch 188 operates a holding circuit in the photoelectric cell circuit for the scanning inspection operation at station No. 4.

It will be noted that the several switches 184 through 188 are mounted in arcuate slots 190 for positional adjustment relative to the cam 180 for timing purposes.

We claim:

1. Apparatus for automatic optical inspection of glass containers comprising a plurality of horizontally spaced photo-sensitive elements, means for engaging the upper ends of glass containers, means for rotating said engaging means to rotate the containers on their vertical axes, means for moving said engaging means intermittently horizontally to dispose each of said containers successively above and in registry with each of said photo-sensitive elements, and means at each position of registry for directing a beam of light against containers disposed in registry with said photo-sensitive elements for transmission through the bodies thereof whereby light radiates downwardly from the bottom walls of said containers to said photo-sensitive elements, said several light directing means being directed at different portions of said containers for successively inspecting different portions of the bodies thereof.

2. Apparatus for automatic optical inspection of glass containers, a turret mounted for rotation about an upright axis, a plurality of chucks spaced circumferentially about said turret and adapted to engage the upper ends of glass containers, said chucks defining a horizontal circular series of container positions comprising a loading position, a plurality of inspection positions, and discharge positions for good and bad containers, means for intermittently rotating said turret to advance said chucks from position to position about said turret axis, means for directing a beam of light against different portions of said containers at each of said inspection positions, means for rotating said chucks at said inspection positions to rotate said containers on their vertical axes, a series of light sensitive elements disposed beneath said turret in coaxial registry with the containers at said plurality of inspection positions, means at each chuck for recording a reject condition of the container carried thereby, and means operable by a variation of light level at any of said light sensitive elements for setting up such reject condition means at said inspection position, said reject condition means being operable to discharge a container selectively at one or another of said discharge positions according to whether the reject condition means has been actuated at any of said inspection stations or not.

3. A method of inspecting glass containers which comprises rotating a container on its axis relatively rapidly with a photo-sensitive element disposed beneath the container to receive light radiated from the bottom thereof, directing a light beam substantially radially against the side wall of the container and moving said light beam vertically during such rapid rotation to describe a continuous helix about the wide wall of the container to scan the same, whereby said photo-sensitive element detects abnormalities in the container by variations in the light transmitted by the walls of the container and radiated to the underlying photo-sensitive element.

4. Apparatus for automatic optical inspection of glass containers comprising a plurality of horizontally spaced photo-sensitive elements, means for engaging the upper ends of glass containers, means for rotating said engaging means to rotate the containers on their vertical axes, means for moving said engaging means intermittently horizontally to dispose each of said containers successively above and in registry with each of said photo-sensitive elements, and a plurality of means for directing beams of light against containers disposed in registry with said photo-sensitive elements for transmission through the bodies thereof whereby light radiates downwardly from the bottom walls of said containers to said photo-sensitive elements, one of said light directing means being mounted for relatively slow movement in a direction parallel to the axis of a container at a rate much slower than the surface speed of rotation of said container to describe a continuous helix about said container and thus scan the periphery thereof in a single continuous vertical sweep of said light directing means.

References Cited by the Examiner

UNITED STATES PATENTS

| | | | |
|---|---|---|---|
| 2,100,227 | 11/37 | Stoate. | |
| 2,132,447 | 10/38 | Stout | 209—73 |
| 2,176,557 | 10/39 | Lippold | 198—22 |
| 2,253,581 | 8/41 | Reynolds | 209—111.5 |
| 2,331,277 | 10/43 | Stout | 209—111.5 |
| 2,338,868 | 1/44 | Owens | 209—82 |
| 2,352,091 | 6/44 | Fedorchak | 209—88 |
| 2,353,758 | 7/44 | Peck | 209—82 |
| 2,433,043 | 12/47 | Gray | 198—22 |
| 2,582,494 | 1/52 | Lorenz | 209—88 |
| 2,593,127 | 4/52 | Fedorchak | 209—111.5 |

ROBERT B. REEVES, *Acting Primary Examiner.*

CLAUDE A. LE ROY, ABRAHAM BERLIN, ERNEST A. FALLER, Jr., *Examiners*